US010135692B2

(12) United States Patent
Purushotham et al.

(10) Patent No.: US 10,135,692 B2
(45) Date of Patent: Nov. 20, 2018

(54) HOST MANAGEMENT ACROSS VIRTUALIZATION MANAGEMENT SERVERS

(71) Applicant: VMWARE, INC., Palo Alto, CA (US)

(72) Inventors: Rupesh Purushotham, Bangalore (IN); Ram Prakash Soni, Bangalore (IN); Shwetha Lakshman Rao, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 379 days.

(21) Appl. No.: 14/848,382

(22) Filed: Sep. 9, 2015

(65) Prior Publication Data

US 2016/0380832 A1 Dec. 29, 2016

(30) Foreign Application Priority Data

Jun. 29, 2015 (IN) .......................... 3314/CHE/2015

(51) Int. Cl.
*H04L 12/26* (2006.01)
*H04L 12/24* (2006.01)
*H04L 12/911* (2013.01)
*G06F 9/455* (2018.01)

(52) U.S. Cl.
CPC .......... *H04L 41/12* (2013.01); *G06F 9/45558* (2013.01); *H04L 43/08* (2013.01); *H04L 47/781* (2013.01); *G06F 2009/45591* (2013.01)

(58) Field of Classification Search
CPC .......................... G06F 9/44505–9/5088; H04L 41/046–41/0659; H04L 41/12; H04L 63/107; H04L 63/1416; H04L 67/10–67/1008
See application file for complete search history.

(56) References Cited

U.S. PATENT DOCUMENTS

| | | | |
|---|---|---|---|
| 2008/0030764 A1* | 2/2008 | Zhu ........................ | G06F 9/5038 358/1.15 |
| 2011/0231843 A1* | 9/2011 | Shimogawa .......... | G06F 9/5088 718/1 |
| 2012/0297039 A1* | 11/2012 | Acuna ................. | H04L 67/1097 709/223 |
| 2015/0128274 A1* | 5/2015 | Giokas ................ | H04L 63/1416 726/23 |
| 2016/0105350 A1* | 4/2016 | Greifeneder .......... | H04L 41/046 709/224 |

* cited by examiner

*Primary Examiner* — Wing F Chan
*Assistant Examiner* — Raji Krishnan
(74) *Attorney, Agent, or Firm* — Loza & Loza, LLP (57) ABSTRACT

In an example, method of managing hosts across a plurality of virtualization management servers, each of the plurality of virtualization management servers managing a plurality of the hosts, each of the hosts configured with virtualization software executing at least one virtual computing instance is disclosed. The method includes deploying, by a rescue service, a rescue agent on each of the plurality of virtualization management servers; obtaining host inventories and configurations at the rescue service for the plurality of virtualization management servers; assigning each of the plurality of virtualization management servers to a category of a plurality of categories based on configuration maximums of the plurality of virtualization management servers; and updating rescue storage managed by the rescue service to monitor resource usage of the plurality of virtualization management servers based on assigned category and the host inventories.

20 Claims, 6 Drawing Sheets

| VC Name | Host Name | Cluster ID | VC Group | VC Status |
|---------|-----------|------------|----------|-----------|
| vc1 | host11 | cluster_id | group 1 | inactive |
| vc1 | host12 | cluster_id | group 1 | inactive |
| vc1 | host13 | cluster_id | group 1 | inactive |
| ... | ... | ... | ... | ... |
| vc2 | host21 | cluster_id | group 1 | active |
| ... | ... | ... | ... | ... |

| Categorization Table with Resource Usages | | | | | | |
|---|---|---|---|---|---|---|
| Server | Host Usages | | | VM Usages | | |
| | Capacity | Current Usages | Free Resources | Capacity | Current Usages | Free Resources |
| VC1 | 1-100 | 30 | 70 | 1-1000 | 500 | 500 |
| VC2 | 100-400 | 150 | 250 | 1000-4000 | 2500 | 1500 |
| VC3 | 400-1000 | 700 | 300 | 4000-15000 | 14000 | 1000 |
| ... | ... | ... | ... | ... | ... | ... |
| VCn | ... | ... | ... | ... | ... | ... |

HOST MANAGEMENT ACROSS VIRTUALIZATION MANAGEMENT SERVERS

RELATED APPLICATIONS

Benefit is claimed under 35 U.S.C. 119(a)-(d) to Foreign application Serial No. 3314/CHE/2015 filed in India entitled "HOST MANAGEMENT ACROSS VIRTUALIZATION MANAGEMENT SERVERS", on Jun. 29, 2015, by VMware. Inc., which is herein incorporated in its entirety by reference for all purposes.

BACKGROUND

Computer virtualization is a technique that involves encapsulating a physical computing machine platform into virtual machine(s) executing under control of virtualization software on a hardware computing platform or "host." A virtual machine provides virtual hardware abstractions for processor, memory, storage, and the like to a guest operating system. The virtualization software, also referred to as a "hypervisor", includes one or more virtual machine monitors (VMMs) to manage the virtual machine(s).

A virtualization management server can be used to manage a group of hosts, each executing virtual machines. The virtualization management server can be used to enable various multi-virtual machine features, such as disaster recovery, high-availability, resource pooling, clustering, and the like. If the virtualization management server fails, the features managed by the virtualization management server can be degraded or inoperable. For example, if a virtualization management server that manages disaster recovery for a group of virtual machines fails, the disaster recovery feature will be inoperable. As such, the virtual machines will not be protected by the intended disaster recovery scheme until the virtualization management server is recovered.

SUMMARY

One or more embodiments provide techniques for host management across virtualization management servers. In an example, method of managing hosts across a plurality of virtualization management servers, each of the plurality of virtualization management servers managing a plurality of the hosts, each of the hosts configured with virtualization software executing at least one virtual computing instance is disclosed. The method includes deploying, by a rescue service, a rescue agent on each of the plurality of virtualization management servers; obtaining host inventories and configurations at the rescue service for the plurality of virtualization management servers; assigning each of the plurality of virtualization management servers to a category of a plurality of categories based on configuration maximums of the plurality of virtualization management servers; and updating rescue storage managed by the rescue service to monitor resource usage of the plurality of virtualization management servers based on assigned category and the host inventories.

Further embodiments include a non-transitory computer-readable storage medium comprising instructions that cause a computer system to carry out the above method above, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Techniques for host management across virtualization management servers are described. In various embodiments, a virtualized computing system includes a virtualization management server that manages a plurality of hosts ("host inventory"). Each of the hosts includes one or more virtual computing instances, such as virtual machine (VMs), container(s), or the like. For example, each of the hosts can include a hypervisor that executes one or more VMs. A computing environment (e.g., an enterprise network, cloud network, etc.) can include a plurality of such virtualized computing systems. Each of the virtualization management servers is configured to implement features for the virtual computing instances executing, on the managed hosts, such as high availability (HA), disaster recovery, resource pools, clusters, and the like. If a virtualization management server becomes inactive (e.g., due to failure), the individual virtual computing instances continue to execute with the active hosts. However, absent the rescue service described herein, the features provided by the failed virtualization management server would be inactive.

In embodiments, a rescue service is configured to organize virtualization management servers into groups. The rescue service can execute in an operating system (OS) installed on a server or in a guest OS installed in a VM. The rescue service deploys rescue agents to each virtualization management server in a group. The rescue service communicates with each rescue agent to monitor host inventory for the respective virtualization management server, as well as to obtain a configuration of the respective virtualization management server (e.g., the features implemented by the respective virtualization management server). The rescue service can categorize each virtualization management server based on configuration maximums (e.g., maximum number of managed hosts, maximum amount of assigned memory, maximum number of virtual computing instances, etc.). The rescue service can monitor resource usage among the managed hosts based on the received host inventories and assigned categories. For example, the rescue service can track current resource usage for each virtualization management server (e.g., number of managed hosts, number of virtual computing instances, etc.), as well as the amount of free resources for each virtualization management server. The rescue service can store resource usage information, configuration information, and status for the virtualization management servers in rescue storage (e.g., a database managed by the rescue service).

In embodiments, the rescue service monitors status of the virtualization management servers through the deployed rescue agents. When the rescue service detects inactivation of a virtualization management server, the rescue service executes a failover process. During failover, the rescue service identifies the configuration of the inactivated virtualization management server and orphaned hosts caused by the inactivation of a virtualization management server. The orphaned hosts can be individual hosts or cluster(s) of hosts. The rescue service then re-assigns the orphaned hosts among the active virtualization management servers in the group based on the resource usage information maintained in the rescue storage. The rescue service also re-configures the active virtualization management servers to manage the newly added hosts. The features that were active on the orphaned hosts will resume on the active virtualization management servers with minimal downtime.

Figure 1:
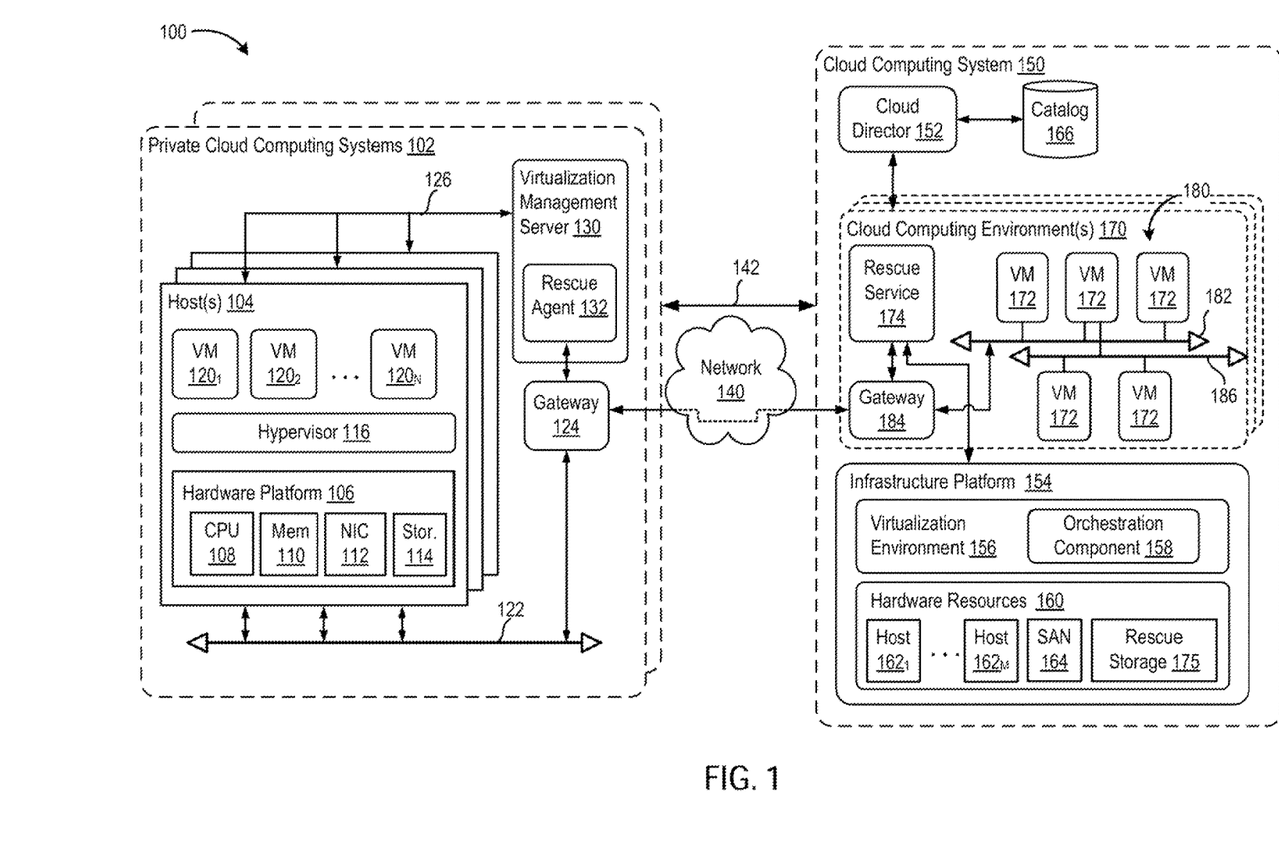
FIG. 1 is a block diagram of a hybrid cloud computing, system in which one or more embodiments of the present disclosure may be utilized.

FIG. 1 is a block diagram of a hybrid cloud computing system 100 in which one or more embodiments of the present disclosure may be utilized. Hybrid cloud computing system 100 includes private cloud computing systems 102 and a cloud computing system 150, and is configured to provide a common platform for managing and executing virtual workloads seamlessly between private cloud systems 102 and cloud computing system 150. In one embodiment, private cloud systems 102 may be data center controlled and administrated by a particular enterprise or business organization, while cloud computing system 150 is operated by a cloud computing service provider and exposed as a service available to account holders, such as the particular enterprise in addition to other enterprises. As such, private cloud systems 102 may sometimes be referred to as an on-premise data center(s), and cloud computing system 150 may be referred to as a "public" cloud service. In some embodiments, private cloud systems 102 may be configured as a private cloud service provided by the enterprise.

As used herein, an internal cloud or "private" cloud is a cloud in Which a tenant and a cloud service provider are part of the same organization, while an external or "public" cloud is a cloud that is provided by an organization that is separate from a tenant that accesses the external cloud. For example, the tenant may be part of an enterprise, and the external cloud may be pan of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Each private cloud system 102 includes a virtualized computing system comprising one or more host computer systems 104. Hosts 104 may be constructed on a server grade hardware platform 106, such as an x86 architecture platform, a desktop, and a laptop. As Shown, hardware platform 106 of each host 104 may include conventional components of a computing device, such as one or more processors (CPUs) 108, system memory 110, a network interface 112, storage system 114, and other 110 devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within private cloud system 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network attached storage (NAS), as well as other network data storage systems.

Each host 404 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware® ESXi™ hypervisor provided as pan of the VMware® vSphere® solution made commercially available from VMware. Inc. Hypervisor 116 may run on top of the operating system of host 114 or directly on hardware components of host 104.

Private cloud system 102 includes a virtualization management server 130 that may communicate to the plurality of hosts 104 via a network, sometimes referred to as a management network 126. In one embodiment virtualization management server 130 comprises a central server, which may reside in private cloud system 102, or alternatively, running as a VM in one of hosts 104. One example of virtualization management server 130 is the vCenter® Server product made available from VMware. Inc. Virtualization management server 130 is configured to carry out administrative tasks for private cloud system 102, including managing hosts 104, managing VMs 120 running within each host 104, provisioning VMs, migrating VMs from one host to another host, and load balancing between hosts 104.

In an embodiment, virtualization management server 130 includes a rescue agent 132 configured to communicate with a rescue service 174 (described below). In an embodiment, rescue agent 132 can directly communicate with rescue service 174 (e.g., by a direct network connection or the like). In another embodiment, rescue agent 132 can communicate with rescue service 174 through gateway 124, network 140, and gateway 184. Gateway 124 (e.g., executing as a virtual appliance) is configured to provide VMs 120 and other components in private cloud system 102 with connectivity to an external network 140 (e.g., Internet). Gateway 124 may manage external public IP addresses for VMs 120 and route traffic incoming to and outgoing from private cloud system 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. In particular, cloud computing system 150 can be configured to provide rescue service 174. Cloud computing system 150 includes an infrastructure platform 154 upon which a cloud computing environment 170 may be executed. In the particular embodiment of FIG. 1, infrastructure platform 154 includes hardware resources 160 having computing resources (e.g hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations. Hardware resources 160 can also include rescue storage 175 managed by rescue service 174.

Each cloud computing environment 170 is associated with a particular tenant of cloud computing system 150, such as the enterprise providing private cloud systems 102 in one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VW) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to private cloud system 102, virtualization environment 156 may be implemented by running on hosts 162 VMware ESX™-based hypervisor technologies provided by VMware. Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud, computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vAppt™ technology made available by VMware. Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses the virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within private cloud system 102. In other embodiments, gateway 184 may be configured to connect to communicate with private cloud systems 102 using a high-throughput, dedicated link (depicted as a direct connect 142) between private cloud systems 102 and cloud computing system 150. In one or more embodiments, gateways 124 and 184 are configured to provide a "stretched" layer-2 (L2) network that spans private cloud system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet, in yet other embodiments, one or more gateway instances that are shared among all the tenants of cloud computing system 150 may be used to manage all public-facing traffic incoming and outgoing from cloud computing system 150.

In one embodiment, a virtual data center 180 includes rescue service 174 configured to communicate with rescue agents 132 in private cloud systems 102 to enable management of virtualization management servers 130. Rescue service 174 (e.g., executing as a virtual appliance) may communicate with each rescue agent 132 using Internet-based traffic via a VPN tunnel established between gateways 124 and 184, or alternatively, using direct connect 142.

Figure 2:
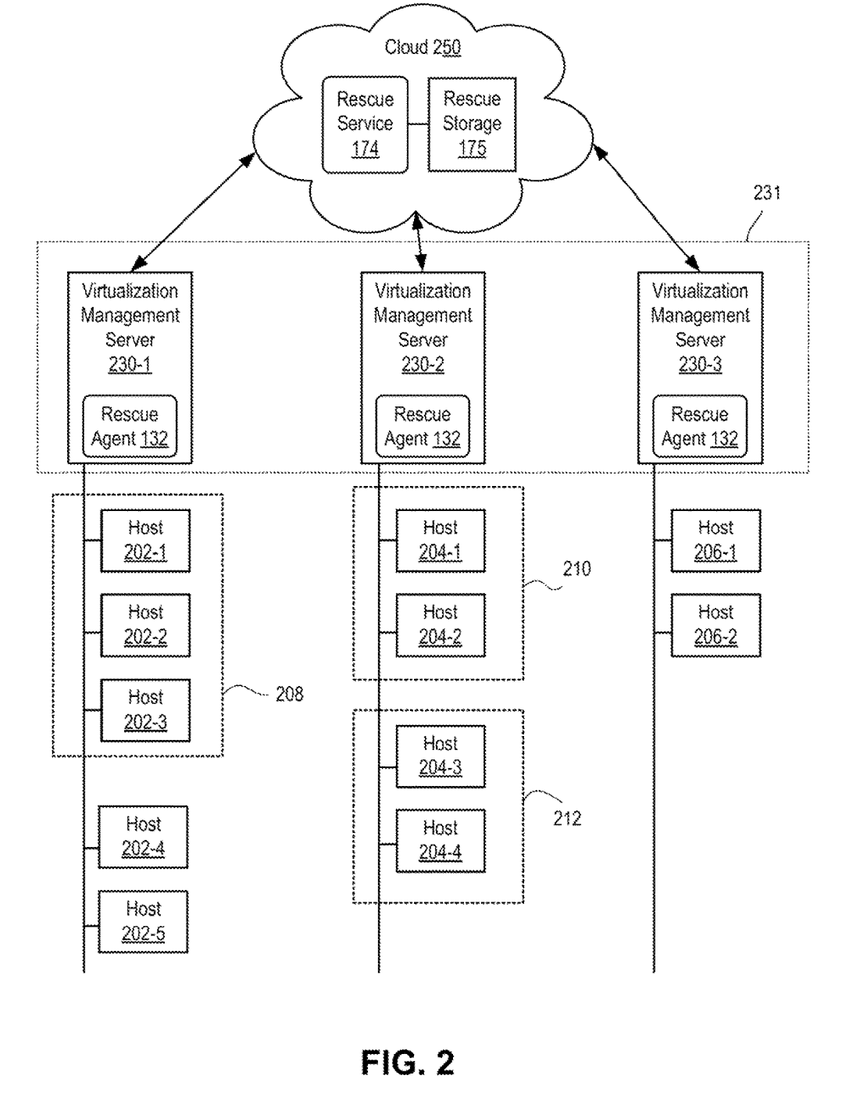
FIG. 2 is a block diagram depicting a computing environment according to an embodiment.

FIG. 2 is a block diagram depicting a computing environment 200 according to an embodiment. The computing environment 200 includes a cloud computing system 250 coupled to a plurality of virtualization management servers 230 (e.g., virtualization management servers 230-1, 230-2, and 230-3 are shown in the example). The virtualization management servers 230 are part of a logical group 231 of virtualization management servers. The computing environment 200 can be implemented using the hybrid cloud computing system 100 described above. For example, cloud computing system 250 can be implemented using cloud computing system 150, and virtualization management servers 230 can be implemented by virtualization management servers 130 within the private cloud systems 102. The computing, environment 200 can be implemented using other types of computing systems. In general, cloud computing system 150 and virtualization management servers 230 are implemented using, one or more computer systems.

Cloud computing system 250 executes rescue service 174 and includes rescue storage 175 managed by rescue service 174. Each virtualization management server 230 manages one or more hosts and is configured with a rescue agent 132. In the example shown, virtualization management server 230-1 manages hosts 202-1 through 202-5 (hosts 202), virtualization management server 230-2 manages hosts 204-1 through 204-4 (hosts 204), and virtualization management server 230-3 manages hosts 206-1 and 206-2 (hosts 206). Hosts 202, 204, and 206 can be configured similarly to hosts 104 shown in FIG. 1 and described above. Virtualization management servers 230 can manage various features for the hosts, such as disaster recovery, high availability, resource pools, and the like. As such, some of the hosts can be part of a group or "cluster". In the example, hosts 202-1 through 202-3 comprise a cluster 208 managed by virtualization management server 230-1. For example, cluster 208 can be a disaster recovery cluster. Hosts 204-1 and 204-2 comprise a cluster 210 managed by virtualization management server 230-2. For example, cluster 210 can be another disaster recovery cluster. Hosts 204-3 and 204-4 comprise a cluster 212 also managed by virtualization management server 230-2. For example, cluster 212 can be a high-availability cluster. Hosts 202-4 and 202-5 comprise "stand-alone" hosts managed by virtualization management server 230-1. Hosts 206-1 and 206-2 comprise stand-alone hosts managed by virtualization management server 230-3. The cluster configurations and types shown in FIG. 2 are exemplary and other cluster configurations and types can be employed.

In operation, rescue service 174 manages virtualization management servers 230 as a group. Rescue service 174 can deploy rescue agents 132 to virtualization management servers 230 in the group. Although only a single group of virtualization management servers is shown, it is to be understood that the rescue service 174 can manage one or more groups of virtualization management servers. Rescue agents 132 are configured for communication with rescue service 174. Rescue agents 132 can provide host inventories, or information for accessing host inventories, to rescue service 174. A host inventory includes information describing which hosts are managed by which of virtualization management servers 230. Rescue agents 132 can send configurations, or information for accessing such configurations, to rescue service 174. A configuration can include, for example, which features are enabled for which hosts, network configurations, and the like. For example, rescue agent 132 in virtualization management server 230-1 can indicate that hosts 202-1 through 202-3 are part of a disaster recovery cluster 208. Rescue agent 132 in virtualization management server 230-2 can indicate that hosts 204-1 and 204-2 are part of a disaster recovery cluster 210, and that hosts 204-3 and 204-4 are part of a high-availability cluster 212. Rescue service 174 can store the host inventory and configuration for each virtualization management server 230 in rescue storage 175.

In an embodiment, a virtualization management server 230 can include an embedded database. The embedded database stores the host inventory and configuration for the virtualization management server. In such an embodiment, rescue agent 132 can obtain the host inventory and configuration from the embedded database and provide such information to rescue service 174. In another embodiment, virtualization management server 130 can be coupled to an external database. In such an embodiment, rescue agent 132 can provide access information to rescue service 174 for accessing the host inventory and configuration in the external database. The access information can include, for example, network address of the external database, access credentials, and the like. Thus, in some embodiments that include an embedded database, rescue service 174 can store host inventory and configuration data in rescue storage 175. In other embodiments that include external database(s), rescue service 174 can store database access information that can be used to access host inventory and configuration data in rescue storage 175. In still other embodiments, rescue service 174 can employ a combination of such storage schemes (e.g., some virtualization management servers 130 can have embedded databases, while other virtualization management servers 130 have external databases).

Rescue agents 132 can update rescue service 174 whenever there is a change in host inventory or configuration for virtualization management servers 230. In an embodiment, rescue agents 132 also provide status to rescue service 174 (pushing status information). If rescue service 174 does not receive status from a rescue agent after a threshold time period, rescue service 174 can deem the corresponding virtualization management server as "inactive" failed). In another embodiment, rescue service 174 requests status from rescue agents 132 (pulling status information). If rescue service 174 cannot obtain status from a rescue agent after a threshold time period, rescue service 174 can deem the corresponding virtualization management server as inactive. In still another embodiment, a combination of pushing or pulling status information can be employed. Rescue service 174 can store status for virtualization management servers 230 in rescue storage 175.

Figure 3:
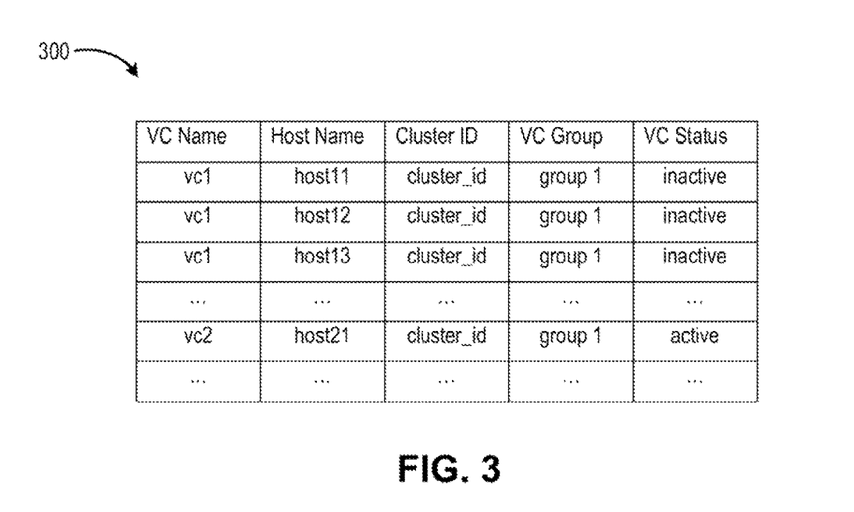
FIG. 3 shows an example table that stores host inventory, configuration, and status information for a group of virtualization management servers.

FIG. 3 shows an example table 300 that stores host inventory configuration, and status information for a group of virtualization management servers. Rescue service 174 can maintain table 300 within rescue storage 175. Table 300 includes columns for "VC Name", "Host Name", "Cluster ID", "VC Group", and "VC Status". The VC Name column includes a name of the virtualization management server (e.g., vc1, vc2, etc.). The Host Name column includes a name of a particular managed host host 11, host 12, etc.). The Cluster ID column includes a name of a particular cluster for a managed host, if any (e.g., cluster_id). The VC Group column includes a name of the group of virtualization management servers managed by rescue service 174 (e.g., group 1). The VC Status column includes an indicator for whether the respective virtualization management server is active or inactive. Table 300 is one of a myriad of possible schemes for managing the host inventory, configuration, and status information for virtualization management servers 230. Table 300 can include more or less columns detailing various information related to the virtualization management servers, the hosts, features enabled for the hosts, and status.

Returning to FIG. 2, rescue service 174 can categorize virtualization management servers 230 based on recommended server inventor size. For example, each of virtualization management servers 230 can support a particular maximum number of hosts, support a particular maximum number of virtual machines, have a particular amount of assigned memory, and the like. For example, rescue service 174 can define the following categories:

TABLE 1

Categorization Table

| | | Parameters | | |
|---|---|---|---|---|
| Level | Server Inventory | Hosts | Memory | VMs |
| Level 1 | Small | 1-100 | 4 GB | 1-1000 |
| Level 2 | Medium | 100-400 | 8 GB | 1000-4000 |
| Level 3 | Large | >400 | 16 GB | >4000 |

As shown in the example of TABLE 1, rescue service 174 can define small, medium, and large categories, each having a particular recommended maximum number of hosts, assigned memory, and virtual machines. The parameters and values in TABLE 1 are exemplary, and any number of categories can be defined based on any number of different parameters having various values.

Figure 4:
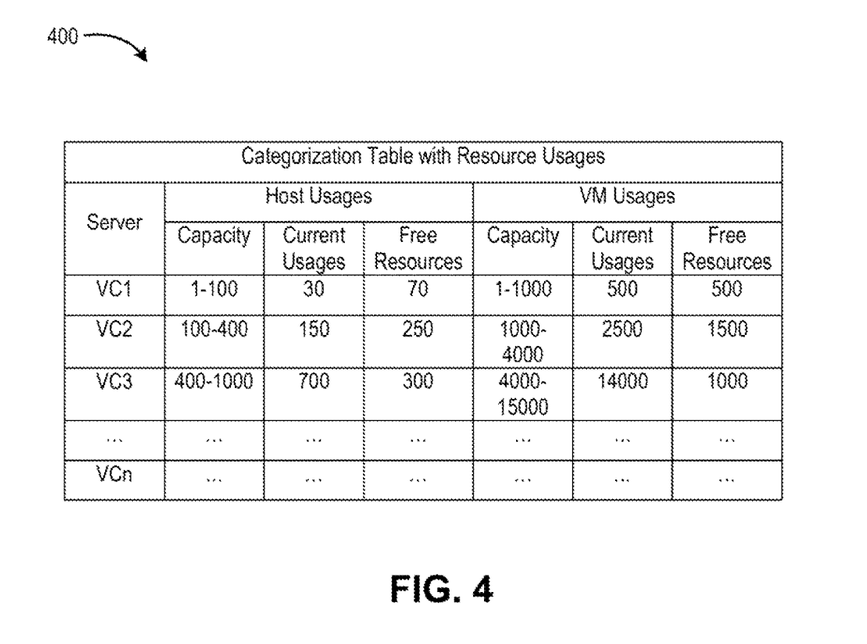
FIG. 4 shows an example table that stores resource usage information for virtualization management servers.

Rescue service 174 can track resource usage given the received host inventories and assigned categories. FIG. 4 shows an example table 400 that stores resource usage information for virtualization management servers 230. Rescue service 174 can maintain table 400 within rescue storage 175. Table 400 includes columns for "Server", "Host Usages", and "VM Usages". Within Host Usages, the table 400 includes columns for "Capacity", "Current Usages", and "Free Resources". Within VM Usages, the table 400 includes columns for "Capacity", "Current Usages", and "Free Resources". In the example, a virtualization management server identified as "VC1" has a capacity of 1-100 hosts (small inventory), is currently managing 30 hosts, and can manage up to 70 additional hosts. A virtualization management server identified as VC2 has a capacity of 100-400 hosts (medium inventory), is currently managing 150 hosts, and can manage up to 250 additional hosts. A virtualization management server identified as VC3 has a capacity of 400-1000 hosts (large inventory), is currently managing 700 hosts, and can manage up to 300 additional hosts. Furthermore, VC1 has a capacity of 1-1000 VMs, is currently managing 500 VMs, and can manage up to 500 additional VMs. VC2 has a capacity of 1000-4000 VMs, is currently managing 2500 VMs, and can manage up to 1500 additional VNIs. Finally, VC3 has a capacity of 4000-15000 VMs, is currently managing 14000 VMs, and can manage up to 1000 additional VMs. Table 400 can include more or less columns detailing various information related to the resource usage of virtualization management servers. For example, rescue service 174 can also account for licensing constraints across virtualization management servers 230.

Returning to FIG. 2, when rescue service 174 detects an inactive virtualization management server, rescue service 174 executes a failover process. A virtualization management server can become inactive due to a failure. Alternatively, a virtualization management server can become inactive due to planned maintenance. In either case, rescue service 174 executes the failover process. During the failover process, rescue service 174 identifies orphaned hosts due to the inactive virtualization management server (e.g., hosts that are no longer being actively managed by a virtualization management server). Rescue service 174 can obtain a host inventory for the inactive virtualization management server directly from rescue storage 175, or from an external database using access information stored in rescue storage 175. Rescue service 174 can also obtain the configuration for the inactive virtualization management server from the rescue storage 174 (or from the external database). Rescue service 174 can change the status of the inactive virtualization management server within rescue storage 174.

Having Obtained the host inventory and configuration, rescue service 174 determines which of the active virtualization management servers in the group can handle the orphaned hosts based on the current resource usage information stored in rescue storage 175. Rescue service 174 keeps clusters of hosts together based on the obtained configuration. That is, rescue service 174 will add each host in a given cluster to the inventory of the same virtualization management server. Rescue service 174 can communicate with rescue agent 132 to update host inventories, create clusters, create network configurations, and the like in order to migrate the orphaned hosts from the inactive virtualization management server. Rescue service 174 migrates the orphaned hosts in a manner to preserves the enabled features e.g., disaster recovery, high availability, resource pools, etc.). Based on the current resource usage, rescue service 174 can balance the load across the active virtualization management servers. The features that were active on the orphaned hosts will resume on the active virtualization management servers with minimal downtime.

If rescue service 174 detects that an inactive virtualization management server is again active service 174 can migrate hosts back to the re-activated virtualization management server (e.g., fail back). In some embodiments, rescue service 174 can transfer all previously migrated hosts back to the re-activated virtualization management server. In other embodiments, rescue service 174 can transfer none or some of the previously migrated hosts back to the re-activated management server, in still other embodiments, rescue service 174 can transfer new hosts to a re-activated virtualization management server for purposes of load balancing.

Figure 5:
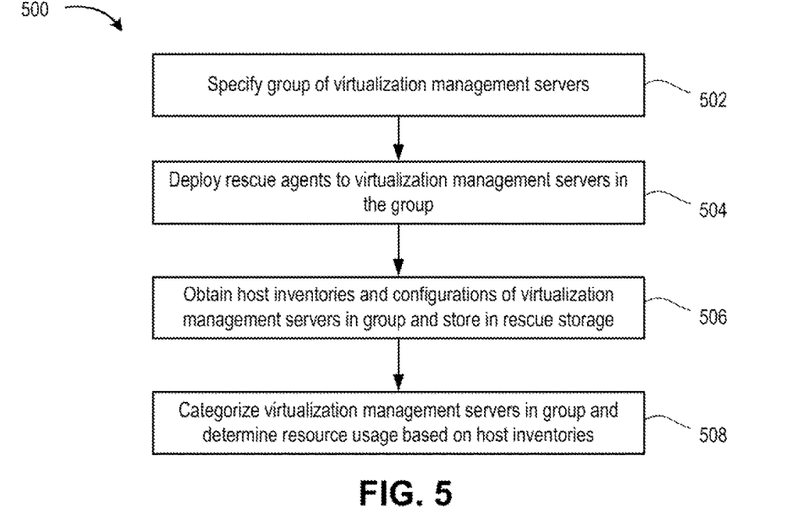
FIG. 5 is a flow diagram depicting a method of configuring, a group of virtualization management servers according to an embodiment.

FIG. 5 is a flow diagram depicting a method 500 of configuring a group of virtualization management servers according to an embodiment. Method 500 can be performed by rescue service 174 described above. At step 502, a user interacts with rescue service 174 to specify a group of virtualization management servers to be managed together. At step 504, rescue service 174 deploys rescue agents to the virtualization management servers. At step 506, rescue service 174 obtains host inventories and configurations of virtualization management servers in the group and stores the obtained data in rescue storage 175. At step 508, rescue service 174 categorizes the virtualization management servers in the group and determines resource usage based on the host inventories.

Figure 6:
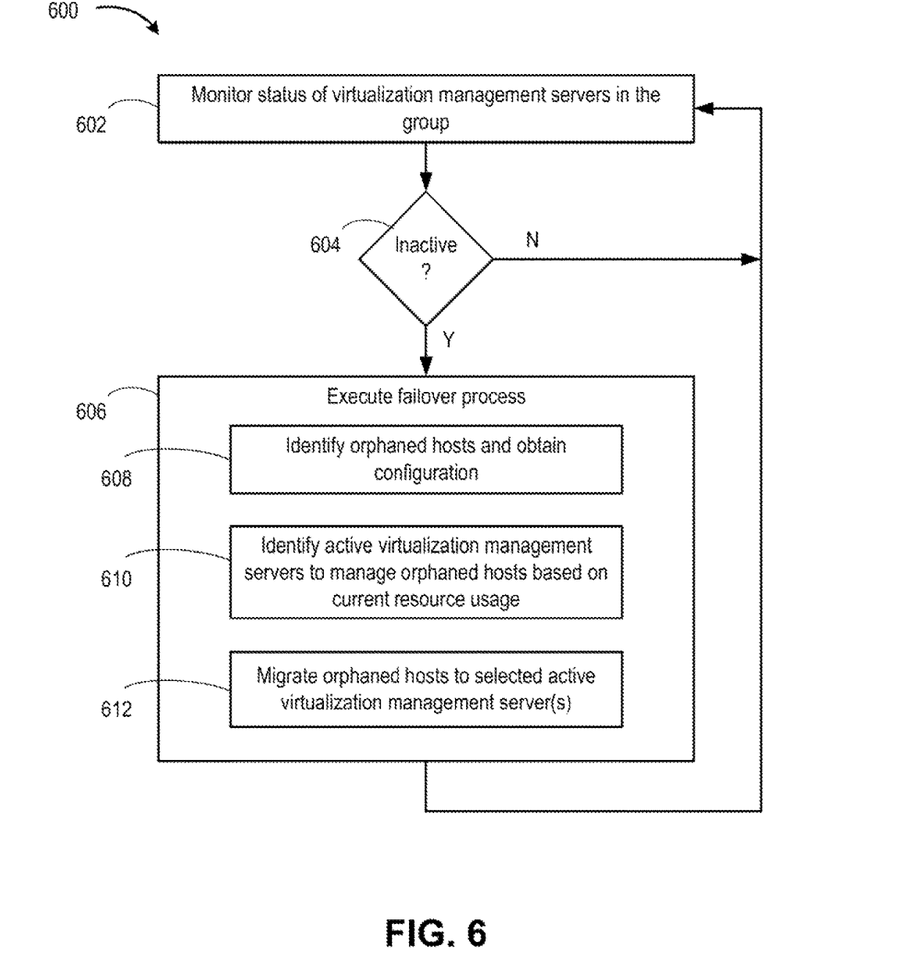
FIG. 6 is a flow diagram depicting a method of migrating orphaned hosts to active virtualization management servers according to an embodiment.

FIG. 6 is a flow diagram depicting a method 600 of migrating orphaned hosts to active virtualization management servers according to an embodiment. Method 600 can be performed by rescue service 174 described above. At step 602, rescue service 174 monitors status of the virtualization management servers in the group. At step 604, rescue service 174 determines whether any virtualization management server in the group is inactive. If so, method 600 proceeds to step 606. Otherwise, method 600 returns to step 602. At step 606, rescue service 174 executes a failover process. The failover process includes a step 608, where rescue service 174 identifies orphaned hosts and obtains the configuration of the inactive virtualization management server. At step 610, rescue service 174 identifies active virtualization management server(s) to manage the orphaned hosts based on current resource usage. At step 612, rescue service 174 migrates the orphaned hosts to the selected active virtualization management server(s) after creating required configurations, such as clusters, networks, and the like.

Figure 7:
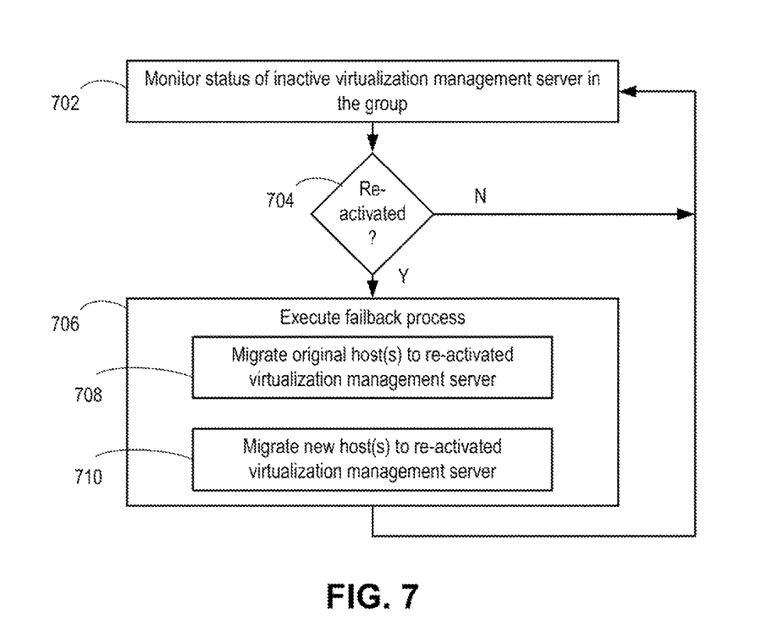
FIG. 7 is a flow diagram depicting a method of migrating host(s) back to a re-activated virtualization management server according to an embodiment.

FIG. 7 is a flow diagram depicting a method 700 of migrating host(s) back to a re-activated virtualization management server according to an embodiment. Method 700 can be performed by rescue service 174 described above. At step 702, rescue service 174 monitors status of inactive virtualization management server(s) in the group. At step 704, rescue service 174 determines whether any inactive virtualization management server in the group has been re-activated. If so, method 700 proceeds to step 706. Otherwise, method 700 returns to step 702. At step 706, rescue service 174 executes a failback process. The failback process can include one or both of steps 708 and/or 710. At step 708, rescue service 174 migrates original host(s) to the re-activated virtualization management server. At step 710, rescue service migrates new host(s) to the re-activated virtualization management server. "New hosts" includes hosts that were not previously managed by the re-activated virtualization management server.

Figure 8:
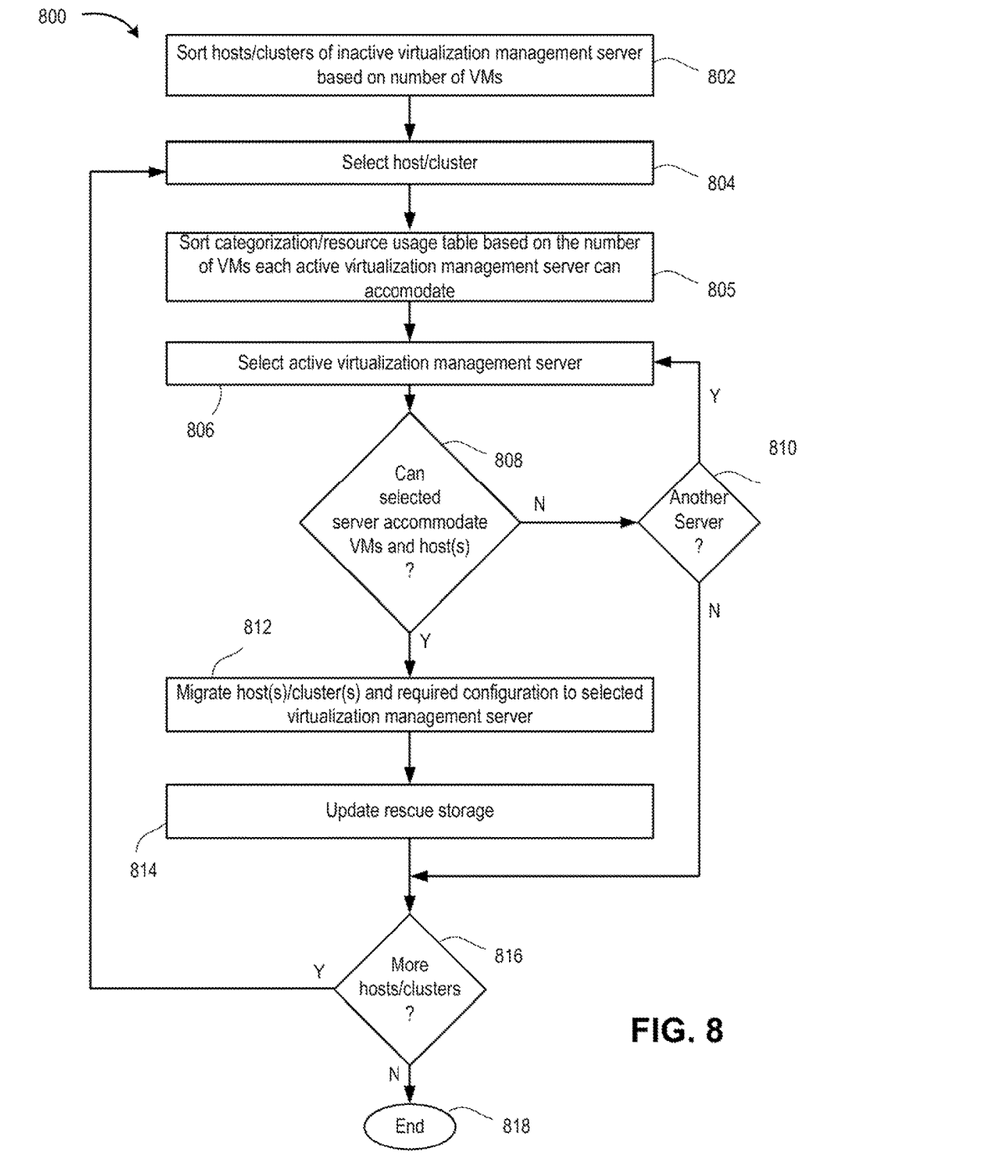
FIG. 8 is a flow diagram depicting a method of selecting virtualization management servers for migration of orphaned hosts according to an embodiment.

FIG. 8 is a flow diagram depicting a method 800 of selecting virtualization management servers for migration of orphaned hosts according to an embodiment. Method 800 can be performed by rescue service 174 during a failover process for an inactive virtualization management server. At step 802, rescue service 174 sorts the orphaned hosts of the inactive virtualization management server based on the number of virtual machines executing in the orphaned hosts. "Orphaned hosts" includes both stand-alone hosts and clusters of hosts. Clusters of hosts are treated as a group. In an example, rescue service 174 sorts the list of orphaned hosts in descending order in terms of virtual machines. At step 804, rescue service 174 selects one or more orphaned hosts to migrate. In case of a cluster, rescue service 174 selects multiple orphaned hosts (all hosts in the cluster).

At step 805, rescue service 174 sorts the categorization and resource usage table based on the number of virtual machines each active virtualization management server can accommodate. An example categorization and resource usage table is shown in FIG. 4 and described above. In an embodiment, rescue service 174 stores the categorization and resource usage table in descending order in terms of the number of VMs the servers can accommodate (e.g., free VMs).

At step 806, rescue service 174 selects an active virtualization management server from the top of the sorted categorization and resource usage table. At step 808, rescue service 174 determines whether the selected active virtualization management server can accommodate the virtual machines and host(s) associated with the selected orphaned host(s). If not, method 800 proceeds to step 810. Otherwise, method 800 proceeds to step 812.

At step 810, rescue service 174 determines whether there are more active virtualization management servers to select. If so, method 800 returns to step 806 and another active virtualization management server is selected from the sorted categorization and resource usage table. Otherwise, method 800 proceeds to step 816. If a given host or cluster of hosts cannot be migrated, rescue service 174 can generate a notification or otherwise indicate the migration failure.

At step 812, rescue service 174 migrates the host(s) and the required configuration to the selected active virtualization management server. At step 814, rescue service 174 updates rescue storage 175. At step 816, rescue service 174 determines whether there are more orphaned hosts to be migrated. If so, method 800 returns to step 804, where rescue service 174 selects another set of one or more orphaned hosts for migration. Otherwise, method 800 ends at step 818.

Techniques for host management across virtualization management servers are described. In an embodiment, a rescue service deploys rescue agents to each virtualization management server in a specified group. The rescue service and rescue agents cooperate to provide uninterrupted management of hosts and clusters of hosts when a given virtualization management server in the group is inactive (e.g., fails or is brought offline for maintenance) Notably, conventional virtualization management servers do not have an option for a maintenance mode. The techniques described herein allow for a virtualization management server to be intentionally brought offline for maintenance. The features enabled by the offline virtualization management server will persist after the rescue service has completed the failover process described herein. That is, the hosts of the of offline virtualization management server are migrated to active virtualization management servers in the group. The hosts can be migrated back to the re-activated virtualization management server after maintenance is complete.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block. I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and 110.

The various embodiments described herein may employ various computer-implemented operations involving data stored m computer systems. For example, these operations may require physical manipulation of physical quantities usually, though not necessarily, these quantities may take the form of electrical or magnetic signals. Where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

The invention claimed is:

1. A method of managing hosts across a plurality of virtualization management servers, each of the plurality of virtualization management servers managing a plurality of the hosts, each of the hosts configured with virtualization software executing at least one virtual computing instance, the method comprising:

deploying, by a rescue service, a rescue agent on each of the plurality of virtualization management servers, wherein the rescue service in cooperation with the rescue agents facilitates detection of inactivation of the virtualization management servers and migration of hosts managed by inactive virtualization management servers to active virtualization management servers;

obtaining host inventories and configurations at the rescue service for the plurality of virtualization management servers;

assigning each of the plurality of virtualization management servers to a category of a plurality of categories based on configuration maximums of the plurality of virtualization management servers, wherein the configuration maximums include at least one configuration maximum related to the hosts being managed by each of the virtualization management servers; and updating rescue storage managed by the rescue service to monitor resource usage of the plurality of virtualization management servers based on the assigned category and the host inventories.

2. The method of claim 1, wherein the step of obtaining the host inventories and the configurations comprises:
obtaining access information for a database used by a first virtualization management server of the plurality of virtualization management servers;
storing the access information in the rescue storage; and
obtaining a host inventory and a configuration for the first virtualization management server by accessing the database using the access information.

3. The method of claim 1, wherein the step of obtaining the host inventories and the configurations comprises:
obtaining a host inventory and a configuration for a first virtualization management server of the plurality of virtualization management servers from an embedded database of the first virtualization management server; and
storing the host inventory and the configuration in the rescue storage.

4. The method of claim 1, further comprising:
determining, at the rescue service, that a first virtualization management server of the plurality of virtualization management servers is inactive;
identifying, at the rescue service, orphaned hosts for the first virtualization management server;
identifying at least one active virtualization management server of the plurality of virtualization management servers to manage the orphaned hosts based on the resource usage maintained in the rescue storage; and
migrating the orphaned hosts to the at least one active virtualization management server.

5. The method of claim 4, wherein the step of identifying the orphaned hosts comprises:
obtaining a host inventory for the first virtualization management server from the rescue storage or from an external database using access information in the rescue storage.

6. The method of claim 4, wherein the step of identifying the at least one active virtualization management server comprises:
sorting a list of the orphaned hosts;
selecting a set of orphaned hosts having at least one of the orphaned hosts;
storing a categorization and resource usage table representing the resource usage in the rescue storage;
selecting an active virtualization management server of the plurality of virtualization management servers;
migrating the set of orphaned hosts to the selected active virtualization management server; and
updating the categorization and resource usage table.

7. The method of claim 4, wherein the orphaned hosts comprise a cluster of hosts.

8. A computer system, comprising:
a hardware platform comprising a processor and a memory; and
a rescue service comprising code stored in the memory and configured for execution by the processor to:
deploy a rescue agent on each of a plurality of virtualization management servers, each of the plurality of virtualization management servers managing a plurality of the hosts, each of the hosts configured with virtualization software executing at least one virtual computing instance, wherein the rescue service in cooperation with the rescue agents facilitates detection of inactivation of the virtualization management servers and migration of hosts managed by of inactive virtualization management servers to active virtualization management servers;
obtain host inventories and configurations for the plurality of virtualization management servers;
assign each of the plurality of virtualization management servers to a category of a plurality of categories based on configuration maximums of the plurality of virtualization management servers, wherein the configuration maximums include at least one configuration maximum related to the hosts being managed by each of the virtualization management servers; and
update rescue storage to monitor resource usage of the plurality of virtualization management servers based on assigned category and the host inventories.

9. The computer system of claim 8, wherein the rescue service is executable by the processor to:
obtain access information for an external database used by a first virtualization management server of the plurality of virtualization management servers;
store the access information in the rescue storage; and
obtain a host inventory and a configuration for the first virtualization management server by accessing the external database using the access information.

10. The computer system of claim 8, wherein the rescue service is executable by the processor to:
obtain a host inventory and a configuration for a first virtualization management server of the plurality of virtualization management servers from an embedded database of the first virtualization management server; and
store the host inventory and the configuration in the rescue storage.

11. The computer system of claim 8, wherein the rescue service is executable by the processor to:
determine that a first virtualization management server of the plurality of virtualization management servers is inactive;
identify orphaned hosts for the first virtualization management server;
identify at least one active virtualization management server of the plurality of virtualization management servers to manage the orphaned hosts based on the resource usage maintained in the rescue storage; and
migrate the orphaned hosts to the at least one active virtualization management server.

12. The computer system of claim 11, wherein the rescue service is executable by the processor to:
obtain a host inventory for the first virtualization management server from the rescue storage or from an external database using access information in the rescue storage.

13. The computer system of claim 11, wherein the rescue service is executable by the processor to:
sort a list of the orphaned hosts;
select a set of orphaned hosts having at least one of the orphaned hosts;
store a categorization and resource usage table representing the resource usage in the rescue storage;
select an active virtualization management server of the plurality of virtualization management servers;
migrate the set of orphaned hosts to the selected active virtualization management server; and
update the categorization and resource usage table.

14. A non-transitory computer readable medium comprising instructions, which when executed in a computer system, causes the computer system to carry out a method of managing hosts across a plurality of virtualization management servers, each of the plurality of virtualization management servers managing a plurality of the hosts, each of the hosts configured with virtualization software executing at least one virtual computing instance, the method comprising:

deploying, by a rescue service, a rescue agent on each of the plurality of virtualization management servers, wherein the rescue service in cooperation with the rescue agents facilitates detection of inactivation of the virtualization management servers and migration of hosts managed by of inactive virtualization management servers to active virtualization management servers;

obtaining host inventories and configurations at the rescue service for the plurality of virtualization management servers;

assigning each of the plurality of virtualization management servers to a category of a plurality of categories based on configuration maximums of the plurality of virtualization management servers, wherein the configuration maximums include at least one configuration maximum related to the hosts being managed by each of the virtualization management servers; and updating rescue storage managed by the rescue service to monitor resource usage of the plurality of virtualization management servers based on assigned category and the host inventories.

15. The non-transitory computer readable medium of claim 14, wherein the step of obtaining the host inventories and the configurations comprises:

obtaining access information for an external database used by a first virtualization management server of the plurality of virtualization management servers;

storing the access information in the rescue storage; and obtaining a host inventory and a configuration for the first virtualization management server by accessing the external database using the access information.

16. The non-transitory computer readable medium of claim 14, wherein the step of obtaining the host inventories and the configurations comprises:

obtaining a host inventory and a configuration for a first virtualization management server of the plurality of virtualization management servers from an embedded database of the first virtualization management server; and storing the host inventory and the configuration in the rescue storage.

17. The non-transitory computer readable medium of claim 14, further comprising:

determining, at the rescue service, that a first virtualization management server of the plurality of virtualization management servers is inactive;

identifying, at the rescue service, orphaned hosts for the first virtualization management server;

identifying at least one active virtualization management server of the plurality of virtualization management servers to manage the orphaned hosts based on the resource usage maintained in the rescue storage; and migrating the orphaned hosts to the at least one active virtualization management server.

18. The non-transitory computer readable medium of claim 17, wherein the step of identifying the orphaned hosts comprises:

obtaining a host inventory for the first virtualization management server from the rescue storage or from an external database using access information in the rescue storage.

19. The non-transitory computer readable medium of claim 17, wherein the step of identifying the at least one active virtualization management server comprises:

sorting a list of the orphaned hosts;

selecting a set of orphaned hosts having at least one of the orphaned hosts;

storing a categorization and resource usage table representing the resource usage in the rescue storage;

selecting an active virtualization management server of the plurality of virtualization management servers;

migrating the set of orphaned hosts to the selected active virtualization management server; and updating the categorization and resource usage table.

20. The non-transitory computer readable medium of claim 17, wherein the orphaned hosts comprise a cluster of hosts.

* * * * *